United States Patent
Nguyen et al.

(10) Patent No.: US 11,204,491 B2
(45) Date of Patent: Dec. 21, 2021

(54) COMPACT VARIABLE FOCUS CONFIGURATIONS

(71) Applicant: Magic Leap, Inc., Plantation, FL (US)

(72) Inventors: Bach Nguyen, Coral Springs, FL (US); David C. Lundmark, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 198 days.

(21) Appl. No.: 16/427,337

(22) Filed: May 30, 2019

(65) Prior Publication Data
US 2019/0369383 A1    Dec. 5, 2019

Related U.S. Application Data

(60) Provisional application No. 62/678,234, filed on May 30, 2018.

(51) Int. Cl.
*G02B 26/00* (2006.01)
*G02B 27/01* (2006.01)
*G02B 3/14* (2006.01)

(52) U.S. Cl.
CPC ............. *G02B 26/004* (2013.01); *G02B 3/14* (2013.01); *G02B 27/0172* (2013.01); *G02B 2027/0178* (2013.01)

(58) Field of Classification Search
CPC .... G02B 26/004; G02B 3/14; G02B 27/0172; G02B 2027/0178
USPC ....................................................... 359/666
See application file for complete search history.

(56) References Cited

U.S. PATENT DOCUMENTS

| 4,344,092 A | 8/1982 | Miller |
| 4,652,930 A | 3/1987 | Crawford |
| 4,810,080 A | 3/1989 | Grendol et al. |
| 4,997,268 A | 3/1991 | Dauvergne |

(Continued)

FOREIGN PATENT DOCUMENTS

| EP | 0535402 A1 | 4/1993 |
| EP | 1215522 A2 | 6/2002 |

(Continued)

OTHER PUBLICATIONS

Invitation to Pay Additional Fees dated Sep. 24, 2020, International Patent Application No. PCT/US2020/043596, (3 pages).

(Continued)

*Primary Examiner* — Collin X Beatty
(74) *Attorney, Agent, or Firm* — Stephen M. De Klerk

(57) ABSTRACT

One embodiment is directed to a head-wearable viewing component for presenting virtual image information to a user, comprising: a head wearable frame; a left optical element for a left eye of the user, the left optical element coupled to the head wearable frame and comprising a left fluid/membrane lens configured to have an electromechanically adjustable focal length for the left eye of the user; a right optical element for a right eye of the user, the right optical element coupled to the head wearable frame and comprising a right fluid/membrane lens configured to have an electromechanically adjustable focal length for the right eye of the user; and a controller operatively coupled to the left optical element and right optical element and configured to provide one or more.

15 Claims, 9 Drawing Sheets

(56) References Cited

U.S. PATENT DOCUMENTS

| | | |
|---|---|---|
| 5,007,727 A | 4/1991 | Kahaney et al. |
| 5,074,295 A | 12/1991 | Willis |
| 5,240,220 A | 8/1993 | Elberbaum |
| 5,410,763 A | 5/1995 | Bolle |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,854,872 A | 12/1998 | Tai |
| 5,864,365 A | 1/1999 | Sramek et al. |
| 6,012,811 A | 1/2000 | Chao et al. |
| 6,016,160 A | 1/2000 | Coombs et al. |
| 6,076,927 A | 6/2000 | Owens |
| 6,117,923 A | 9/2000 | Amagai et al. |
| 6,124,977 A | 9/2000 | Takahashi |
| 6,191,809 B1 | 2/2001 | Hori et al. |
| 6,375,369 B1 | 4/2002 | Schneider et al. |
| 6,541,736 B1 | 4/2003 | Huang et al. |
| 6,757,068 B2 | 6/2004 | Foxlin |
| 7,431,453 B2 | 10/2008 | Hogan |
| 7,573,640 B2 | 8/2009 | Nivon et al. |
| 7,724,980 B1 | 5/2010 | Shenzhi |
| 7,751,662 B2 | 7/2010 | Kleemann |
| 7,758,185 B2 | 7/2010 | Lewis |
| 8,246,408 B2 | 8/2012 | Elliot |
| 8,353,594 B2 | 1/2013 | Lewis |
| 8,508,676 B2 | 8/2013 | Silverstein et al. |
| 8,547,638 B2 | 10/2013 | Levola |
| 8,619,365 B2 | 12/2013 | Harris et al. |
| 8,696,113 B2 | 4/2014 | Lewis |
| 8,733,927 B1 | 5/2014 | Lewis |
| 8,736,636 B2 | 5/2014 | Kang |
| 8,759,929 B2 | 6/2014 | Shiozawa et al. |
| 8,793,770 B2 | 7/2014 | Lim |
| 8,823,855 B2 | 9/2014 | Hwang |
| 8,847,988 B2 | 9/2014 | Geisner et al. |
| 8,874,673 B2 | 10/2014 | Kim |
| 9,010,929 B2 | 4/2015 | Lewis |
| 9,095,437 B2 | 8/2015 | Boyden et al. |
| 9,239,473 B2 | 1/2016 | Lewis |
| 9,244,293 B2 | 1/2016 | Lewis |
| 9,581,820 B2 | 2/2017 | Robbins |
| 9,658,473 B2 | 5/2017 | Lewis |
| 9,671,566 B2 | 6/2017 | Abovitz et al. |
| 9,671,615 B1 | 6/2017 | Vallius et al. |
| 9,874,664 B2 | 1/2018 | Stevens et al. |
| 9,955,862 B2 | 5/2018 | Freeman et al. |
| 9,996,797 B1 | 6/2018 | Holz et al. |
| 10,018,844 B2 | 7/2018 | Levola et al. |
| 10,151,937 B2 | 12/2018 | Lewis |
| 10,185,147 B2 | 1/2019 | Lewis |
| 10,218,679 B1 | 2/2019 | Jawahar |
| 10,516,853 B1 | 12/2019 | Gibson et al. |
| 10,551,879 B1 | 2/2020 | Richards et al. |
| 10,578,870 B2 | 3/2020 | Kimmel |
| 2001/0010598 A1 | 8/2001 | Aritake et al. |
| 2002/0063913 A1 | 5/2002 | Nakamura et al. |
| 2002/0071050 A1 | 6/2002 | Homberg |
| 2002/0122648 A1 | 9/2002 | Mule' et al. |
| 2002/0140848 A1 | 10/2002 | Cooper et al. |
| 2003/0048456 A1 | 3/2003 | Hill |
| 2003/0067685 A1 | 4/2003 | Niv |
| 2003/0077458 A1 | 4/2003 | Korenaga et al. |
| 2003/0219992 A1 | 11/2003 | Schaper |
| 2004/0001533 A1 | 1/2004 | Tran et al. |
| 2004/0021600 A1 | 2/2004 | Wittenberg |
| 2004/0042377 A1 | 3/2004 | Nikoloai et al. |
| 2004/0174496 A1 | 9/2004 | Ji et al. |
| 2004/0186902 A1 | 9/2004 | Stewart |
| 2004/0240072 A1 | 12/2004 | Schindler et al. |
| 2004/0246391 A1 | 12/2004 | Travis |
| 2005/0001977 A1 | 1/2005 | Zelman |
| 2005/0157159 A1 | 7/2005 | Komiya et al. |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0038880 A1 | 2/2006 | Starkweather et al. |
| 2006/0050224 A1 | 3/2006 | Smith |
| 2006/0126181 A1 | 6/2006 | Levola |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0250322 A1 | 11/2006 | Hall et al. |
| 2006/0268220 A1 | 11/2006 | Hogan |
| 2007/0058248 A1* | 3/2007 | Nguyen .................. G02B 7/06 359/407 |
| 2007/0159673 A1 | 7/2007 | Freeman et al. |
| 2007/0188837 A1 | 8/2007 | Shimizu et al. |
| 2007/0204672 A1 | 9/2007 | Huang et al. |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0063802 A1 | 3/2008 | Maula et al. |
| 2008/0068557 A1 | 3/2008 | Menduni et al. |
| 2008/0146942 A1 | 6/2008 | Dala-Krishna |
| 2008/0205838 A1 | 8/2008 | Crippa et al. |
| 2008/0316768 A1 | 12/2008 | Travis |
| 2009/0153797 A1 | 6/2009 | Allon et al. |
| 2009/0224416 A1 | 9/2009 | Laakkonen et al. |
| 2009/0245730 A1 | 10/2009 | Kleemann |
| 2009/0310633 A1 | 12/2009 | Ikegami |
| 2010/0019962 A1 | 1/2010 | Fujita |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0232016 A1 | 9/2010 | Landa et al. |
| 2010/0244168 A1 | 9/2010 | Shiozawa et al. |
| 2010/0296163 A1 | 11/2010 | Sarikko |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0050535 A1 | 3/2012 | Densham et al. |
| 2012/0081392 A1 | 4/2012 | Arthur |
| 2012/0113235 A1 | 5/2012 | Shintani |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0249741 A1 | 10/2012 | Maciocci et al. |
| 2012/0307075 A1 | 12/2012 | Margalitq |
| 2012/0314959 A1 | 12/2012 | White et al. |
| 2012/0320460 A1 | 12/2012 | Levola |
| 2012/0326948 A1 | 12/2012 | Crocco et al. |
| 2013/0050833 A1 | 2/2013 | Lewis et al. |
| 2013/0077170 A1 | 3/2013 | Ukuda |
| 2013/0094148 A1 | 4/2013 | Sloane |
| 2013/0169923 A1 | 7/2013 | Schnoll et al. |
| 2013/0336138 A1 | 12/2013 | Venkatraman et al. |
| 2014/0016821 A1 | 1/2014 | Arth et al. |
| 2014/0022819 A1 | 1/2014 | Oh et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0267419 A1 | 9/2014 | Ballard et al. |
| 2014/0274391 A1 | 9/2014 | Stafford |
| 2014/0359589 A1 | 12/2014 | Kodsky et al. |
| 2015/0005785 A1 | 1/2015 | Olson |
| 2015/0009099 A1 | 1/2015 | Queen |
| 2015/0123966 A1 | 5/2015 | Newman |
| 2015/0130790 A1 | 5/2015 | Vazquez, II et al. |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0205126 A1 | 7/2015 | Schowengerdt |
| 2015/0235431 A1 | 8/2015 | Schowengerdt |
| 2015/0253651 A1 | 9/2015 | Russell et al. |
| 2015/0256484 A1 | 9/2015 | Cameron |

(56) References Cited

U.S. PATENT DOCUMENTS

| | | |
|---|---|---|
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0027215 A1 | 1/2016 | Burns et al. |
| 2016/0077338 A1 | 3/2016 | Robbins et al. |
| 2016/0085300 A1 | 3/2016 | Robbins et al. |
| 2016/0093099 A1 | 3/2016 | Bridges |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0202496 A1 | 7/2016 | Billetz et al. |
| 2016/0217624 A1 | 7/2016 | Finn et al. |
| 2016/0266412 A1 | 9/2016 | Yoshida |
| 2016/0274733 A1 | 9/2016 | Hasegawa et al. |
| 2016/0321551 A1 | 11/2016 | Priness et al. |
| 2016/0327798 A1 | 11/2016 | Xiao et al. |
| 2016/0334279 A1 | 11/2016 | Mittleman et al. |
| 2016/0357255 A1 | 12/2016 | Lindh et al. |
| 2016/0370404 A1 | 12/2016 | Quadrat et al. |
| 2016/0370510 A1 | 12/2016 | Thomas |
| 2017/0038607 A1 | 2/2017 | Camara |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0127295 A1 | 5/2017 | Black et al. |
| 2017/0147066 A1 | 5/2017 | Katz et al. |
| 2017/0160518 A1 | 6/2017 | Lanman et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0232345 A1 | 8/2017 | Rofougaran et al. |
| 2017/0235126 A1* | 8/2017 | DiDomenico ....... G02B 26/005 349/1 |
| 2017/0235142 A1 | 8/2017 | Wall et al. |
| 2017/0235144 A1 | 8/2017 | Piskunov et al. |
| 2017/0235147 A1 | 8/2017 | Kamakura |
| 2017/0243403 A1 | 8/2017 | Daniels et al. |
| 2017/0254832 A1 | 9/2017 | Ho et al. |
| 2017/0281054 A1 | 10/2017 | Stever et al. |
| 2017/0287376 A1 | 10/2017 | Bakar et al. |
| 2017/0293141 A1 | 10/2017 | Schowengerdt et al. |
| 2017/0312032 A1 | 11/2017 | Amanatullah et al. |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2018/0059305 A1 | 3/2018 | Popovich et al. |
| 2018/0067779 A1 | 3/2018 | Pillalamarri et al. |
| 2018/0070855 A1 | 3/2018 | Eichler |
| 2018/0082480 A1 | 3/2018 | White et al. |
| 2018/0088185 A1 | 3/2018 | Woods et al. |
| 2018/0102981 A1 | 4/2018 | Kurtzman et al. |
| 2018/0136466 A1* | 5/2018 | Ko ..................... G02B 27/0172 |
| 2018/0190017 A1 | 7/2018 | Mendez et al. |
| 2018/0250589 A1 | 9/2018 | Cossairt et al. |
| 2019/0005069 A1 | 1/2019 | Filgueiras de Araujo et al. |
| 2019/0011691 A1* | 1/2019 | Peyman ............... A61B 3/1225 |
| 2019/0056591 A1 | 2/2019 | Tervo et al. |
| 2019/0101758 A1 | 4/2019 | Zhu et al. |
| 2019/0172216 A1 | 6/2019 | Ninan et al. |
| 2019/0196690 A1 | 6/2019 | Chong et al. |
| 2019/0243123 A1* | 8/2019 | Bohn .................. G02B 3/14 |
| 2019/0347853 A1 | 11/2019 | Chen et al. |
| 2020/0117267 A1 | 4/2020 | Gibson et al. |
| 2020/0117270 A1 | 4/2020 | Gibson et al. |
| 2020/0309944 A1 | 10/2020 | Thoresen et al. |
| 2021/0033871 A1* | 2/2021 | Jacoby ................. G02B 13/14 |
| 2021/0041951 A1 | 2/2021 | Gibson et al. |

FOREIGN PATENT DOCUMENTS

| | | |
|---|---|---|
| EP | 1938141 A1 | 7/2008 |
| EP | 1943556 A2 | 7/2008 |
| EP | 3164776 B1 | 5/2017 |
| EP | 3236211 A1 | 10/2017 |
| EP | 2723240 B1 | 8/2018 |
| JP | 2003-029198 A | 1/2003 |
| JP | 2007-012530 A | 1/2007 |
| JP | 2009-244869 A | 10/2009 |
| JP | 2012-015774 A | 1/2012 |
| JP | 6232763 B2 | 11/2017 |
| WO | 2002/071315 A2 | 9/2002 |
| WO | 2006132614 A1 | 12/2006 |
| WO | 2007/085682 A1 | 8/2007 |
| WO | 2007/102144 A1 | 9/2007 |
| WO | 2008148927 A1 | 12/2008 |
| WO | 2009/101238 A1 | 8/2009 |
| WO | 2013/049012 A1 | 4/2013 |
| WO | 2015143641 A1 | 10/2015 |
| WO | 2016/054092 A1 | 4/2016 |
| WO | 2017004695 A1 | 1/2017 |
| WO | 2018/044537 A1 | 3/2018 |
| WO | 2018087408 A1 | 5/2018 |
| WO | 2018166921 A1 | 9/2018 |
| WO | 2019148154 A1 | 8/2019 |
| WO | 2020010226 A1 | 1/2020 |

OTHER PUBLICATIONS

Notice of Allowance dated Oct. 5, 2020, U.S. Appl. No. 16/682,911, (27 pages).

Notice of Reason of Refusal dated Sep. 11, 2020 with English translation, Japanese Patent Application No. 2019-140435, (6 pages).

International Search Report and Written Opinion dated Sep. 4, 2020, International Patent Application No. PCT/US20/31036, (13 pages).

Non Final Office Action dated Sep. 1, 2020, U.S. Appl. No. 16/214,575, (40 pages).

Communication Pursuant to Article 94(3) EPC dated Sep. 4, 2019, European Patent Application No. 10793707.0, (4 pages).

Examination Report dated Jun. 19, 2020, European Patent Application No. 20154750.2, (10 pages).

Extended European Search Report dated May 20, 2020, European Patent Application No. 20154070.5, (7 pages).

Extended European Search Report dated Jun. 12, 2017, European Patent Application No. 16207441.3, (8 pages).

Final Office Action dated Aug. 10, 2020, U.S. Appl. No. 16/225,961, (13 pages).

Final Office Action dated Dec. 4, 2019, U.S. Appl. No. 15/564,517, (15 pages).

Final Office Action dated Feb. 19, 2020, U.S. Appl. No. 15/552,897, (17 pages).

International Search Report and Written Opinion dated Mar. 12, 2020, International PCT Patent Application No. PCT/US19/67919, (14 pages).

International Search Report and Written Opinion dated Aug. 15, 2019, International PCT Patent Application No. PCT/US19/33987, (20 pages).

International Search Report and Written Opinion dated Jun. 15, 2020, International PCT Patent Application No. PCT/US2020/017023, (13 pages).

International Search Report and Written Opinion dated Oct. 16, 2019, International PCT Patent Application No. PCT/US19/43097, (10 pages).

International Search Report and Written Opinion dated Oct. 16, 2019, International PCT Patent Application No. PCT/US19/36275, (10 pages).

International Search Report and Written Opinion dated Oct. 16, 2019, International PCT Patent Application No. PCT/US19/43099, (9 pages).

International Search Report and Written Opinion dated Jun. 17, 2016, International PCT Patent Application No. PCT/FI2016/050172, (9 pages).

(56) References Cited

OTHER PUBLICATIONS

International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Sep. 30, 2019, International Patent Application No. PCT/US19/40324, (7 pages).
International Search Report and Written Opinion dated Jun. 5, 2020, International Patent Application No. PCT/US20/19871, (9 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
Non Final Office Action dated Aug. 21, 2019, U.S. Appl. No. 15/564,517, (14 pages).
Non Final Office Action dated Jul. 27, 2020, U.S. Appl. No. 16/435,933, (16 pages).
Non Final Office Action dated Jun. 17, 2020, U.S. Appl. No. 16/682,911, (22 pages).
Non Final Office Action dated Jun. 19, 2020, U.S. Appl. No. 16/225,961, (35 pages).
Non Final Office Action dated Nov. 19, 2019, U.S. Appl. No. 16/355,611, (31 pages).
Non Final Office Action dated Oct. 22, 2019, U.S. Appl. No. 15/859,277, (15 pages).
Notice of Allowance dated Mar. 25, 2020, U.S. Appl. No. 15/564,517, (11 pages).
Summons to attend oral proceedings pursuant to Rule 115(1) EPC mailed on Jul. 15, 2019, European Patent Application No. 15162521.7, (7 pages).
Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).
Azom, , "Silica—Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>, (6 pages).
Goodfellow, , "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?ArticleID=1179>, (9 pages).
Levola, T. , "Diffractive Optics for Virtual Reality Displays", Journal of the SID EURODISPLAY 14/05, 2005, XP008093627, chapters 2-3, Figures 2 and 10, pp. 467-475.
Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.
Memon, F. et al., "Synthesis, Characterization and Optical Constants of Silicon Oxycarbide", EPJ Web of Conferences; Publication [online]. Mar. 23, 2017 [retrieved Feb. 19, 2020).<URL: https://www.epj-conferences.org/articles/epjconf/pdf/2017/08/epjconf_nanop2017_00002.pdf>; DOI: 10.1051/epjconf/201713900002, (8 pages).
Spencer, T. et al., "Decomposition of poly(propylene carbonate) with UV sensitive iodonium 11 salts", Polymer Degradation and Stability; [online]. Dec. 24, 2010 (retrieved Feb. 19, 2020]., <URL: http://fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10,1016/j.polymdegradstab.2010, 12.003, (17 pages).
Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.
International Search Report and Written Opinion dated Aug. 8, 2019, International PCT Patent Application No. PCT/US2019/034763, (8 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Azuma, Ronald T. , "A Survey of Augmented Reality", Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).
Azuma, Ronald T. , "Predictive Tracking for Augmented Reality", Department of Computer Science, Chapel Hill NC; TR95-007, Feb. 1995, 262 pages.
Bimber, Oliver et al., "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).
Jacob, Robert J. , "Eye Tracking in Advanced Interface Design", Human-Computer Interaction Lab, Naval Research Laboratory, Washington, D.C., date unknown. 2003, pp. 1-50.
Tanriverdi, Vildan et al., "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
European Search Report dated Oct. 15, 2020, European Patent Application No. 20180623.9, (10 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Nov. 4, 2020, European Patent Application No. 20190980.1, (14 pages).
Final Office Action dated Mar. 19, 2021, U.S. Appl. No. 16/530,776, (25 pages).
Final Office Action dated Nov. 24, 2020, U.S. Appl. No. 16/435,933, (44 pages).

(56) References Cited

OTHER PUBLICATIONS

International Search Report and Written Opinion dated Feb. 12, 2021, International Application No. PCT/US20/60555, (25 pages).
International Search Report and Written Opinion dated Feb. 2, 2021, International PCT Patent Application No. PCT/US20/60550, (9 pages).
International Search Report and Written Opinion dated Dec. 3, 2020, International Patent Application No. PCT/US20/43596, (25 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Nov. 5, 2020, U.S. Appl. No. 16/530,776, (45 pages).
"Phototourism Challenge", CVPR 2019 Image Matching Workshop. https://image matching-workshop. github.io. (16 pages).
Altwaijry, et al., "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] < URL: http://www.bmva.org/bmvc/2016/papers/paper049/index.html >, en lire document, especially Abstract, pp. 1-6 and 9.
Arandjelović, Relja et al., "Three things everyone should know to improve object retrieval", CVPR, 2012, (8 pages).
Battaglia, Peter W. et al., "Relational inductive biases, deep Tearning, and graph networks", arXiv:1806.01261, Oct. 17, 2018, pp. 1-40.
Berg, Alexander C et al., "Shape matching and object recognition using low distortion correspondences", In CVPR, 2005, (8 pages).
Bian, Jiawang et al., "GMS: Grid-based motion statistics for fast, ultra-robust feature correspondence.", In CVPR (Conference on Computer Vision and Pattern Recognition), 2017, (10 pages).
Brachmann, Eric et al., "Neural-Guided RANSAC: Learning Where to Sample Model Hypotheses", In ICCV (International Conference on Computer Vision ), arXiv:1905.04132v2 [cs.CV] Jul. 31, 2019, (17 pages).
Butail, et al., "Putting the fish in the fish tank: Immersive VR for animal behavior experiments", In: 2012 IEEE International Conference on Robotics and Automation. May 18, 2012 (May 18, 2012) Retrieved on Nov. 14, 2020 (Nov. 14, 2020) from <http:/lcdcl.umd.edu/papers/icra2012.pdf> entire document, (8 pages).
Caetano, Tibério S et al., "Learning graph matching", IEEE TPAMI, 31(6):1048-1058, 2009.
Cech, Jan et al., "Efficient sequential correspondence selection by cosegmentation", IEEE TPAMI, 32(9):1568-1581, Sep. 2010.
Cuturi, Marco , "Sinkhorn distances: Lightspeed computation of optimal transport", NIPS, 2013, (9 pages).
Dai, Angela et al., "ScanNet: Richly-annotated 3d reconstructions of indoor scenes", In CVPR, arXiv:1702.04405v2 [cs.CV] Apr. 11, 2017, (22 pages).
Deng, Haowen et al., "PPFnet: Global context aware local features for robust 3d point matching", In CVPR, arXiv:1802.02669v2 [cs.CV] Mar. 1, 2018, (12 pages).
Detone, Daniel et al., "Deep image homography estimation", In RSS Work-shop: Limits and Potentials of Deep Learning in Robotics, arXiv:1606.03798v1 [cs.CV] Jun. 13, 2016, (6 pages).
Detone, Daniel et al., "Self-improving visual odometry", arXiv:1812.03245, Dec. 8, 2018, (9 pages).
Detone, Daniel et al., "SuperPoint: Self-supervised interest point detection and description", In CVPR Workshop on Deep Learning for Visual SLAM, arXiv:1712.07629v4 [cs.CV] Apr. 19, 2018, (13 pages).
Dusmanu, Mihai et al., "D2-net: A trainable CNN for joint detection and description of local features", CVPR, arXiv:1905.03561v1 [cs.CV] May 9, 2019, (16 pages).
Ebel, Patrick et al., "Beyond cartesian representations for local descriptors", ICCV, arXiv:1908.05547v1 [cs.CV] Aug. 15, 2019, (11 pages).

Fischler, Martin A et al., "Random sample consensus: a paradigm for model fitting with applications to image analysis and automated cartography", Communications of the ACM, 24(6): 1981, pp. 381-395.
Gilmer, Justin et al., "Neural message passing for quantum chemistry", In ICML, arXiv:1704.01212v2 [cs.LG] Jun. 12, 2017, (14 pages).
Hartley, Richard et al., "Multiple View Geometry in Computer Vision", Cambridge University Press, 2003, pp. 1-673.
Lee, et al., "Self-Attention Graph Pooling", Cornell University Library/Computer Science/ Machine Learning, Apr. 17, 2019 [retrieved on Jan. 8, 2021 from the Internet< URL: https://arxiv.org/abs/1904.08082 >, entire document.
Lee, Juho et al., "Set transformer: A frame-work for attention-based permutation-invariant neural networks", ICML, arXiv:1810.00825v3 [cs.LG] May 26, 2019, (17 pages).
Leordeanu, Marius et al., "A spectral technique for correspondence problems using pairwise constraints", Proceedings of (ICCV) International Conference on Computer Vision, vol. 2, pp. 1482-1489, Oct. 2005, (8 pages).
Li, Yujia et al., "Graph matching networks for learning the similarity of graph structured objects", ICML, arXiv:1904.12787v2 [cs.LG] May 12, 2019, (18 pages).
Li, Zhengqi et al., "Megadepth: Learning single-view depth prediction from internet photos", In CVPR, fromarXiv: 1804.00607v4 [cs.CV] Nov. 28, 2018, (10 pages).
Libovicky, et al., "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document, pp. 253-260.
Loiola, Eliane M. et al., "A survey for the quadratic assignment problem", European journal of operational research, 176(2): 2007, pp. 657-690.
Lowe, David G. , "Distinctive image features from scale-invariant keypoints", International Journal of Computer Vision, 60(2): 91-110, 2004, (28 pages).
Luo, Zixin et al., "ContextDesc: Local descriptor augmentation with cross-modality context", CVPR, arXiv:1904.04084v1 [cs.CV] Apr. 8, 2019, (14 pages).
Munkres, James , "Algorithms for the assignment and transportation problems", Journal of the Society for Industrial and Applied Mathematics, 5(1): 1957, pp. 32-38.
Ono, Yuki et al., "LF-Net: Learning local features from images", 32nd Conference on Neural Information Processing Systems (NIPS 2018), arXiv:1805.09662v2 [cs.CV] Nov. 22, 2018, (13 pages).
Paszke, Adam et al., "Automatic differentiation in Pytorch", 31st Conference on Neural Information Processing Systems (NIPS 2017), Long Beach, CA, USA, (4 pages).
Peyré, Gabriel et al., "Computational Optimal Transport", Foundations and Trends in Machine Learning, 11(5-6):355-607, 2019; arXiv:1803.00567v4 [stat.ML] Mar. 18, 2020, (209 pages).
Qi, Charles R. et al., "Pointnet++: Deep hierarchical feature learning on point sets in a metric space.", 31st Conference on Neural Information Processing Systems (NIPS 2017), Long Beach, CA, USA., (10 pages).
Qi, Charles R et al., "Pointnet: Deep Learning on Point Sets for 3D Classification and Segmentation", CVPR, arXiv:1612.00593v2 [cs.CV] Apr. 10, 201, (19 pages).
Radenović, Filip et al., "Revisiting Oxford and Paris: Large-Scale Image Retrieval Benchmarking", CVPR, arXiv:1803.11285v1 [cs.CV] Mar. 29, 2018, (10 pages).
Raguram, Rahul et al., "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René et al., "Deep fundamental matrix estimation", European Conference on Computer Vision (ECCV), 2018, (17 pages).
Revaud, Jerome et al., "R2D2: Repeatable and Reliable Detector and Descriptor", In NeurIPS, arXiv:1906.06195v2 [cs.CV] Jun. 17, 2019, (12 pages).

(56) References Cited

OTHER PUBLICATIONS

Rocco, Ignacio et al., "Neighbourhood Consensus Networks", 32nd Conference on Neural Information Processing Systems (NeurIPS 2018), Montréal, Canada, arXiv:1810.10510v2 [cs.CV] Nov. 29, 2018, (20 pages).

Rublee, Ethan et al., "ORB: An efficient alternative to SIFT or SURF", Proceedings of the IEEE International Conference on Computer Vision. 2564-2571. 2011; 10.1109/ICCV.2011.612654, (9 pages).

Sarlin, et al., "SuperGlue: Learning Feature Matching with Graph Neural Networks", Cornell University Library/Computer Science/ Computer Vision and Pattern Recognition, Nov. 26, 2019 [retrieved on Jan. 8, 2021 from the Internet< URL: https://arxiv.org/abs/1911.11763 >, entire document.

Sattler, Torsten et al., "SCRAMSAC: Improving RANSAC's efficiency with a spatial consistency filter", ICCV, 2009: 2090-2097., (8 pages).

Schonberger, Johannes L. et al., "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.

Schonberger, Johannes L. et al., "Structure-from-motion revisited", Proceedings of the IEEE Conference on Computer Vision and Pattern Recognition (CVPR), 2016, pp. 4104-4113, (11 pages).

Sinkhorn, Richard et al., "Concerning nonnegative matrices and doubly stochastic matrices.", Pacific Journal of Mathematics, 1967, pp. 343-348.

Thomee, Bart et al., "YFCC100m: The new data in multimedia research", Communications of the ACM, 59(2):64-73, 2016; arXiv:1503.01817v2 [cs.MM] Apr. 25, 2016, (8 pages).

Torresani, Lorenzo et al., "Feature correspondence via graph matching: Models and global optimization", Computer Vision—ECCV 2008, 10th European Conference on Computer Vision, Marseille, France, Oct. 12-18, 2008, Proceedings, Part II, (15 pages).

Tuytelaars, Tinne et al., "Wide baseline stereo matching based on local, affinely invariant regions", BMVC, 2000, pp. 1-14.

Ulyanov, Dmitry et al., "Instance normalization: The missing ingredient for fast stylization", arXiv:1607.08022v3 [cs.CV] Nov. 6, 2017, (6 pages).

Vaswani, Ashish et al., "Attention is all you need", 31st Conference on Neural Information Processing Systems (NIPS 2017), Long Beach, CA, USA; arXiv:1706.03762v5 [cs.CL] Dec. 6, 2017, (15 pages).

Veličković, Petar et al., "Graph attention networks", ICLR, arXiv:1710.10903v3 [stat.ML] Feb. 4, 2018, (12 pages).

Villani, Cédric , "Optimal transport: old and new", vol. 338. Springer Science & Business Media, Jun. 2008, pp. 1-998.

Wang, Xiaolong et al., "Non-local neural networks", CVPR, arXiv:1711.07971v3 [cs.CV] Apr. 13, 2018, (10 pages).

Wang, Yue et al., "Deep Closest Point: Learning representations for point cloud registration", ICCV, arXiv:1905.03304v1 [cs.CV] May 8, 2019, (10 pages).

Wang, Yue et al., "Dynamic Graph CNN for learning on point clouds", ACM Transactions on Graphics, arXiv:1801.07829v2 [cs.CV] Jun. 11, 2019, (13 pages).

Yi, Kwang M. et al., "Learning to find good correspondences", CVPR, arXiv:1711.05971v2 [cs.CV] May 21, 2018, (13 pages).

Yi, Kwang Moo et al., "Lift: Learned invariant feature transform", ECCV, arXiv:1603.09114v2 [cs.CV] Jul. 29, 2016, (16 pages).

Zaheer, Manzil et al., "Deep Sets", 31st Conference on Neural Information Processing Systems (NIPS 2017), Long Beach, CA, USA; arXiv:1703.06114v3 [cs.LG] Apr. 14, 2018, (29 pages).

Zhang, Jiahui et al., "Learning two-view correspondences and geometry using order-aware network", ICCV; aarXiv:1908.04964v1 [cs.CV] Aug. 14, 2019, (11 pages).

Zhang, Li et al., "Dual graph convolutional net-work for semantic segmentation", BMVC, 2019; arXiv:1909.06121v3 [cs.CV] Aug. 26, 2020, (18 pages).

Communication Pursuant to Rule 164(1) EPC dated Jul. 27, 2021, European Patent Application No. 19833664.6 , (11 pages).

Extended European Search Report dated Jul. 16, 2021, European Patent Application No. 19810142.0, (14 pages).

Extended European Search Report dated Jul. 30, 2021, European Patent Application No. 19839970.1, (7 pages).

Final Office Action dated Sep. 17, 2021, U.S. Appl. No. 16/938,782, (44 pages).

Non Final Office Action dated Aug. 4, 2021, U.S. Appl. No. 16/864,721, (51 pages).

Non Final Office Action dated Sep. 20, 2021, U.S. Appl. No. 17/105,848, (56 pages).

Non Final Office Action dated Sep. 29, 2021, U.S. Appl. No. 16/748,193, (62 pages).

Giuseppe, Donato , et al. , "Stereoscopic helmet mounted system for real time 3D environment reconstruction and indoor ego--motion estimation", Proc. SPIE 6955, Head- and Helmet-Mounted Displays XIII: Design and Applications , 69550P.

Sheng, Liu , et al. , "Time-multiplexed dual-focal plane head-mounted display with a liquid Tens" , Optics Letters, Optical Society of Amer I Ca, US, vol. 34, No. 11, Jun. 1, 2009 (Jun. 1, 2009), XP001524475, ISSN: 0146-9592 , pp. 1642-1644.

\* cited by examiner

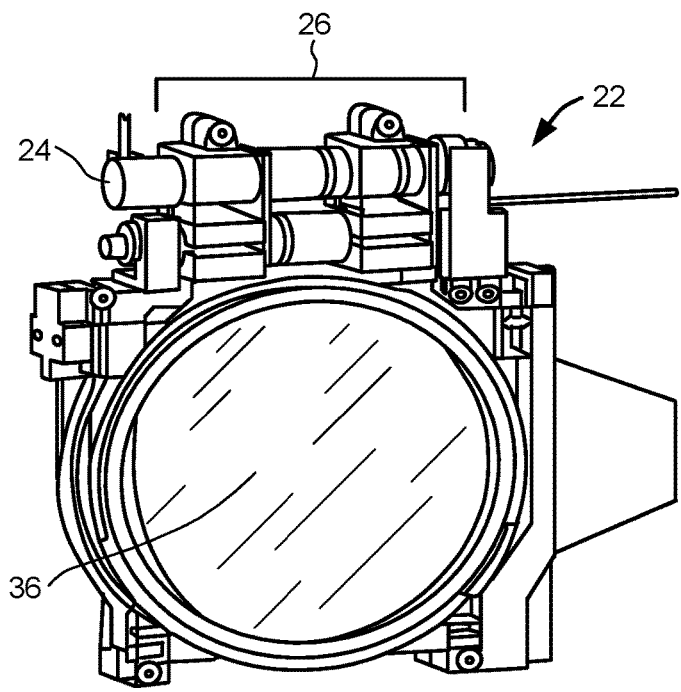
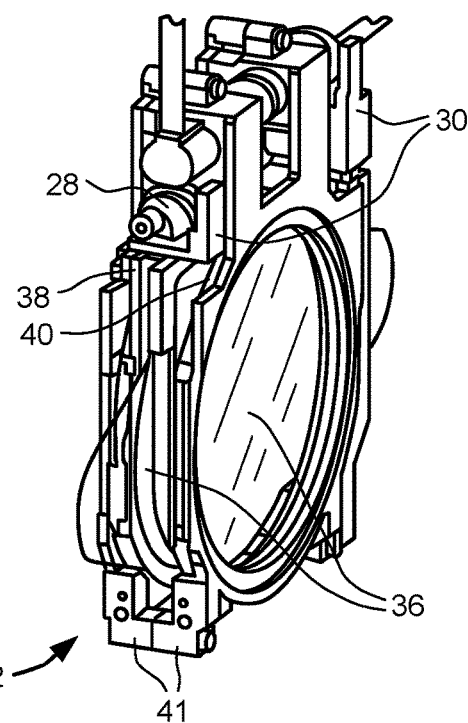
Figure 2A
Figure 2B
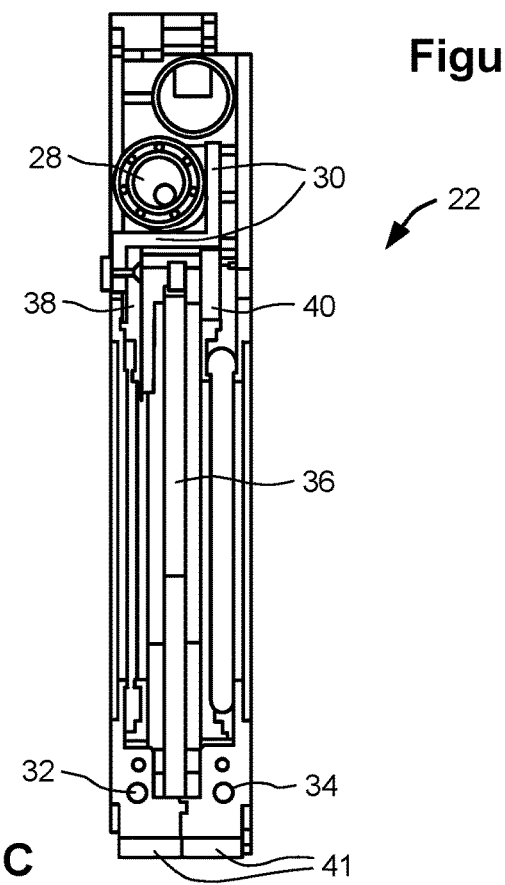
Figure 2C

COMPACT VARIABLE FOCUS CONFIGURATIONS

RELATED APPLICATION DATA

The present application claims the benefit under 35 U.S.C. § 119 to U.S. Provisional Application Ser. No. 62/678,234 filed May 30, 2018. The foregoing application is hereby incorporated by reference into the present application in its entirety.

FIELD OF THE INVENTION

This invention is related to viewing optics assemblies, and more specifically to compact variable focus configurations.

BACKGROUND

It is desirable that mixed reality, or augmented reality, near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch. Referring to FIG. 1, an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth (RTM), and other connectivity standards and configurations. As described, for example, in U.S. patent application Ser. Nos. 14/555,585, 14/690,401, 14/331,218, 15/481,255, and 62/518,539, each of which is incorporated by reference herein in its entirety, various aspects of such components are described, such as various embodiments of the two depicted optical elements (20) through which the user may see the world around them along with visual components which may be produced by the associated system components, for an augmented reality experience. In some variations, true variable focus components may be utilized as components of the optical elements (20) to provide not only one or two focal planes, but a spectrum thereof, selectable or tunable by an integrated control system. Referring to FIGS. 2A-2C and FIG. 3, one category of variable focus configurations comprises a fluid type of lens coupled to a membrane and adjustably housed such that upon rotation of a motor (24), an associated mechanical drive assembly (26) rotationally drives a cam member (28) against a lever assembly (30), which causes two opposing perimetric plates (38, 40) to rotate (48, 46) relative to a main housing assembly (41), and rotate about associated rotation pin joints (32, 34) such that the fluid/membrane lens (36) is squeezed (44/42; or released, depending upon the motor 24/cam 28 direction/positioning), as shown in FIG. 3. This squeezing/releasing and reorientation of the opposing perimetric plates (38, 40) relative to each other changes the focus of the fluid/membrane lens (36), thus providing an electromechanically adjustable variable focus assembly. One of the challenges with such a configuration is that it is relatively bulky from a geometric perspective for integration into a head-wearable type of system component (2). Another challenge is that with such a configuration, due to the nature of the system that re-orients the opposing perimetric plates (38, 40) relative to each other as each of them pivots at the bottom relative to the frame that couples the assembly, there is a concomitant change in image position as the focus is varied; this brings in another undesirably complicating variable which must be dealt with in calibration or other steps or configurations. There is a need for compact variable focus lens systems and assemblies which are optimized for use in wearable computing systems.

SUMMARY OF THE INVENTION

One embodiment is directed to a head-wearable viewing component for presenting virtual image information to a user, comprising: a head wearable frame; a left optical element for a left eye of the user, the left optical element coupled to the head wearable frame and comprising a left fluid/membrane lens configured to have an electromechanically adjustable focal length for the left eye of the user; a right optical element for a right eye of the user, the right optical element coupled to the head wearable frame and comprising a right fluid/membrane lens configured to have an electromechanically adjustable focal length for the right eye of the user; and a controller operatively coupled to the left optical element and right optical element and configured to provide one or more commands thereto to modify the focal lengths of the left optical element and right optical element. The head-wearable viewing component of claim 1, wherein at least one of the left and right optical elements comprises an actuation motor intercoupled between two frame members. The actuation motor may be configured to provide linear actuation. The actuation motor may be configured to provide rotational actuation. The two frame members may be coupled to the left fluid/membrane lens and configured to change the focal length for the user by moving relative to each other. The two frame members may be rotatable relative to each other to modify the focal length for the user. The two frame members may be displaceable relative to each other in a non-rotational manner. The actuation motor may comprise a stepper motor. The actuation motor may comprise a servo motor. The actuation motor may comprise a piezoelectric actuator. The actuation motor may comprise an ultrasonic motor. The actuation motor may comprise an electromagnetic actuator. The actuation motor may comprise a shape memory metal alloy actuator. The controller may be configured to command the left and right optical elements to adjust to one of two selectable predetermined focal lengths. The controller may be configured to command the left and right optical elements to adjust to one of three or more selectable predetermined focal lengths.

BRIEF DESCRIPTION OF THE DRAWINGS

FIGS. 2A-2c and FIG. 3 illustrate various aspects of a fluid lens system.

DETAILED DESCRIPTION

Figure 1:
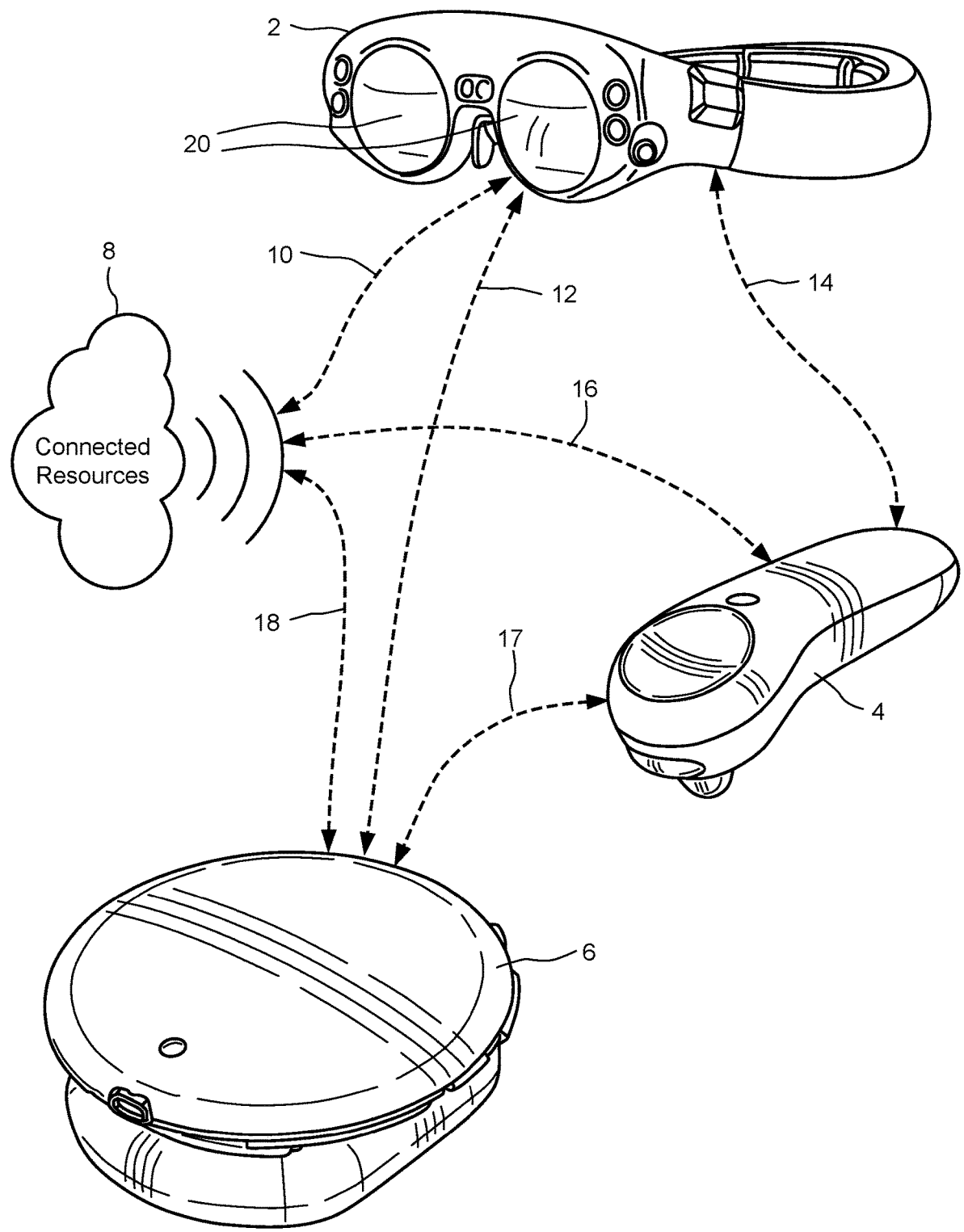
FIG. 1 illustrates a system configuration featuring a head wearable component with left and right optical elements in accordance with the present invention.
Figure 3:
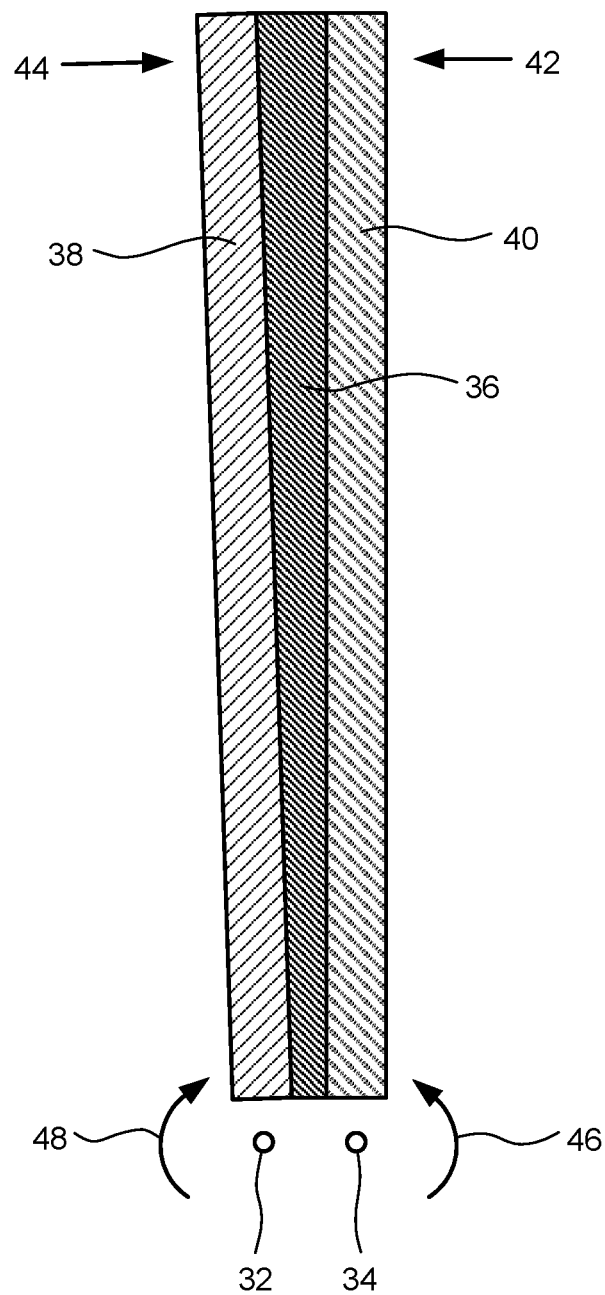
Figure 4A:
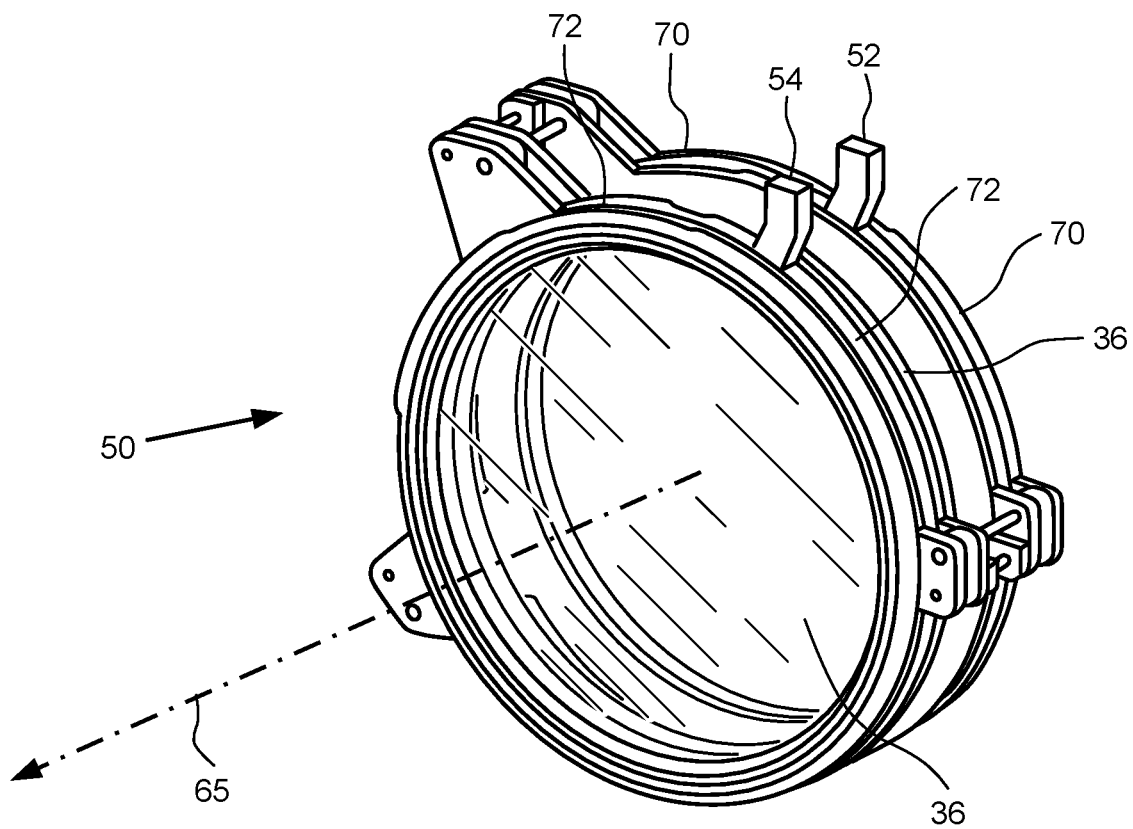
FIGS. 4A-4B illustrate various aspects of a single-motor compact fluid lens configuration in accordance with the present invention.
Figure 4B:
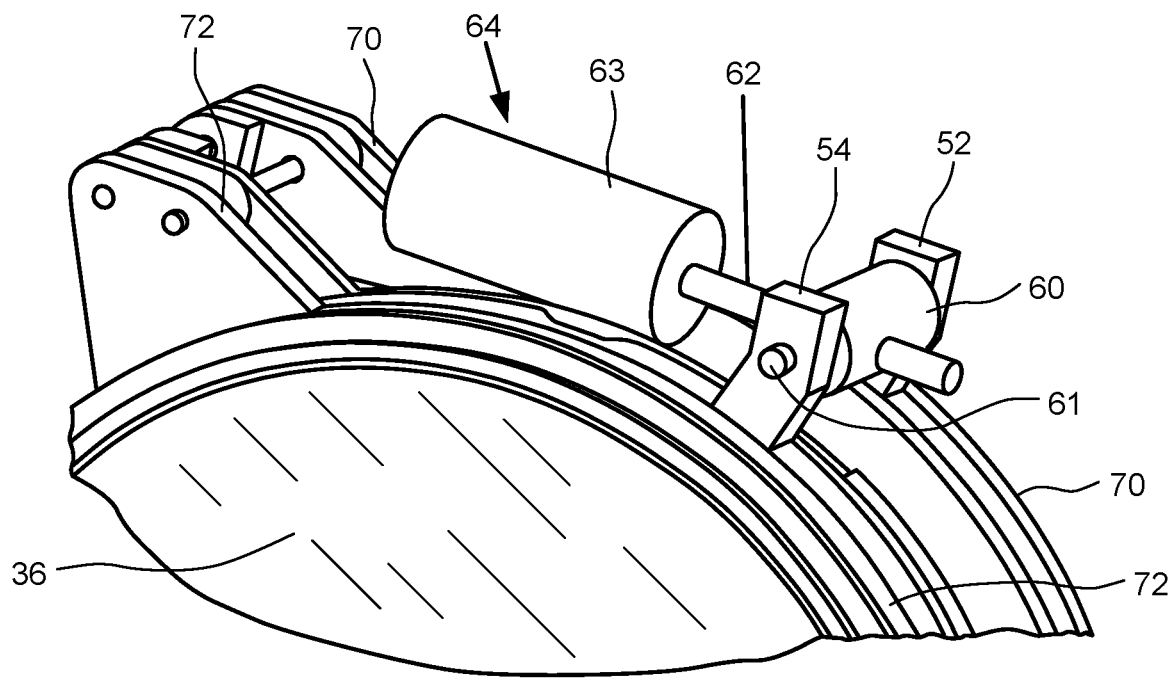

Referring to FIG. 4A, two main elements of one inventive variable focus assembly (50) are a fluid/membrane lens (36) interposed between two relatively rigid perimetric frame members (70, 72). In the depicted embodiment, between the fluid/membrane lens (36) and each of the rigid perimetric frame members (70, 72) is a rotatable adjustment perimetric member (52, 54) which may be controllably and rotatably adjusted relative to the rigid perimetric frame members (70, 72) using a compact actuation motor (64), such as a stepper motor, servo motor, ultrasonic motor (i.e., such as those comprising a plurality of piezoelectric material components comprising one or more piezoelectric materials, such as lead zirconate titanate, lithium niobate, or other single crystal materials, configured in a substantially circular arrangement and operatively coupled to a stator and rotor to produce rotary ultrasonic motor activation, or operatively coupled to a stator and slider to produce linear translation ultrasonic motor activation), or other electromechanical actuator, which may be coupled to the rigid perimetric frame members (56, 58) and also coupled to the rotatable adjustment perimetric members (52, 54) using a coupling assembly such as that depicted in FIG. 4B, featuring a shaft (62) coupled to a barrel member (60) which is coupled to a pin (61) that interfaces with the rotatable adjustment perimetric members (52, 54) as shown. In one embodiment, the motor (64) may be configured to produce controlled linear motion of the shaft (62) and intercoupled barrel member (60) relative to the depicted cylindrical housing (63) of the motor (64), such that by virtue of the intercoupled pin (61), the rotatable adjustment perimetric members (52, 54) are rotated relative to the rigid perimetric frame members (70, 72) about an axis substantially parallel with a central axis (65) that is perpendicular to the center of the intercoupled fluid/membrane lens (36). In another embodiment, the motor (64) may be configured to produce rotational motion of the shaft (62) relative to the depicted cylindrical housing (63) of the motor (64), and the mechanical coupling between the shaft (62) and barrel member (60) may comprise a threaded interface, such that by virtue of the intercoupled pin (61), the rotatable adjustment perimetric members (52, 54) are rotated relative to the rigid perimetric frame members (70, 72) about an axis substantially parallel with a central axis (65) that is perpendicular to the center of the intercoupled fluid/membrane lens (36). The mechanical interface between the rotatable adjustment perimetric members (52, 54) and the rigid perimetric frame members (70, 72) may be configured to comprise perimetrically located features, such as ramps, bumps, or step-ups, which will cause the intercoupled fluid/membrane lens (36) to be squeezed or loosened with a substantially even perimetric loading, such as by three or more interfacial feature groupings (i.e., one at every 120 degrees around the 360 degree perimetric interfaces between the rotatable adjustment perimetric members (52, 54) and the rigid perimetric frame members (70, 72). In other words, the fluid/membrane lens (36) may be loosened or tightened relatively evenly, preferably without substantial movement or reorientation of the image position relative to the plane of the lens. Further, the mechanical perimetric interfaces may be configured such that sequenced levels of tightening or loosening of fluid/membrane lens (36) may be predictably obtained. For example, in one embodiment the motor may be operatively coupled to a controller, such as a microcontroller or microprocessor, such that a desired or commanded tightening or loosening of the fluid/membrane lens (36), which may be correlated with a predetermined focal length for the fluid/membrane lens (36), may be reliably obtained, preferably with relatively low latency, via commands to the motor from the controller. One advantage of such a configuration as shown and described in reference to FIGS. 4A and 4B is that a single motor may be utilized to control the focal length of the fluid/membrane lens (36).

Referring to FIGS. 5-7B, other embodiments are illustrated which are configured to provide substantially even perimetric loading (and thus focus adjustment without substantial movement or reorientation of image position) for a compact variable focus configuration featuring an intercoupled fluid/membrane lens (36).

Figure 5:
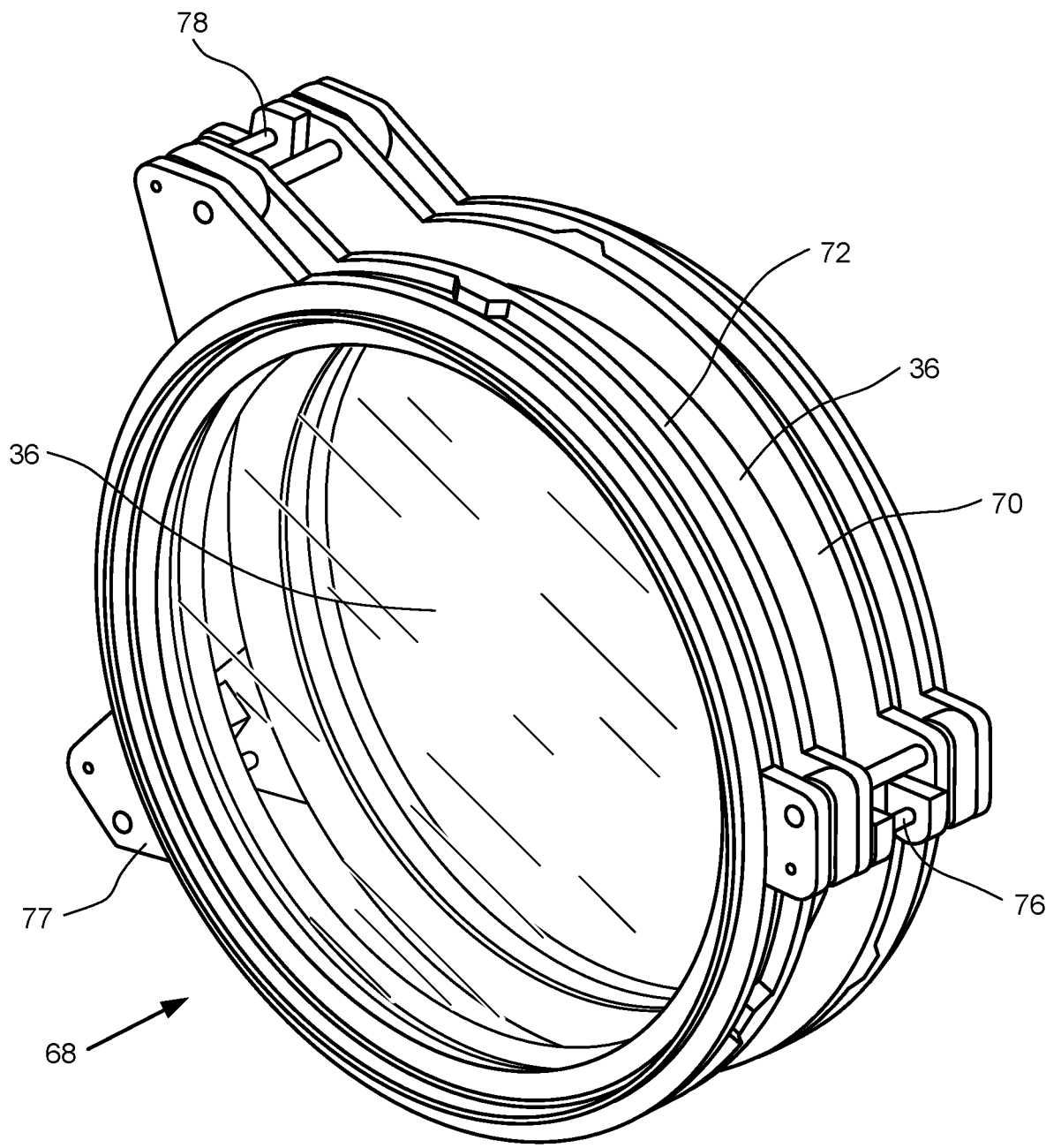
FIGS. 5, 6, and 7A-7B illustrate various aspects of multi-motor compact fluid lens configurations in accordance with the present invention.

Referring to FIG. 5, a compact variable focus assembly (68) features two rigid perimetric frame members (70, 72) and an intercoupled fluid/membrane lens (36), with substantially even perimetric loading of the fluid/membrane lens (36) provided by a plurality of electromagnetic actuators (76, 77, 78), which may be utilized to controllably urge or repel the two rigid perimetric frame members (70, 72) relative to each other to provide controllable focal adjustment. The electromagnetic actuators (76, 77, 78) preferably are placed equidistantly from each other perimetrically (i.e., about 120 degrees from each other) to provide even loading with a 3-actuator configuration as shown. Other embodiments may include more actuators, such as four actuators at 90 degrees apart, etc. In one embodiment, each of the electromagnetic actuators (76, 77, 78) may be operatively coupled between the perimetric frame members (70, 72) such that upon actuation, they urge or repel the perimetric frame members (70, 72) relative to each other with linear actuation; in another embodiment each of the electromagnetic actuators (76, 77, 78) may be operatively coupled between the perimetric frame members (70, 72) such that upon actuation, they cause rotational motion of an intercoupling member, such as an intercoupling member similar to the shaft member (62) of the assembly of FIG. 4B, which may be interfaced with a threaded member, such as a threaded member similar to the barrel member (60) of the assembly of FIG. 4B which may be coupled to one of the perimetric frame members (70, 72), for example, to be converted to linear motion to urge or repel the perimetric frame members (70, 72) relative to each other. In other words, the electromagnetic actuators (76, 77, 78) may be configured to produce either linear or rotational actuation motion, and this linear or rotational actuation motion may be utilized to urge or repel the two rigid perimetric frame members (70, 72) relative to each other to provide controllable focal adjustment.

Preferably one or more predictable levels of tightening or loosening of fluid/membrane lens (36) may be obtained through operation of the electromagnetic actuators (76, 77, 78). For example, in one embodiment the electromagnetic actuators (76, 77, 78) may be operatively coupled to a controller, such as a microcontroller or microprocessor, such that a desired or commanded tightening or loosening of the fluid/membrane lens (36), which may be correlated with a predetermined focal length for the fluid/membrane lens (36), may be reliably obtained, preferably with relatively low latency, via commands to the electromagnetic actuators (76, 77, 78) from the controller.

Figure 6:
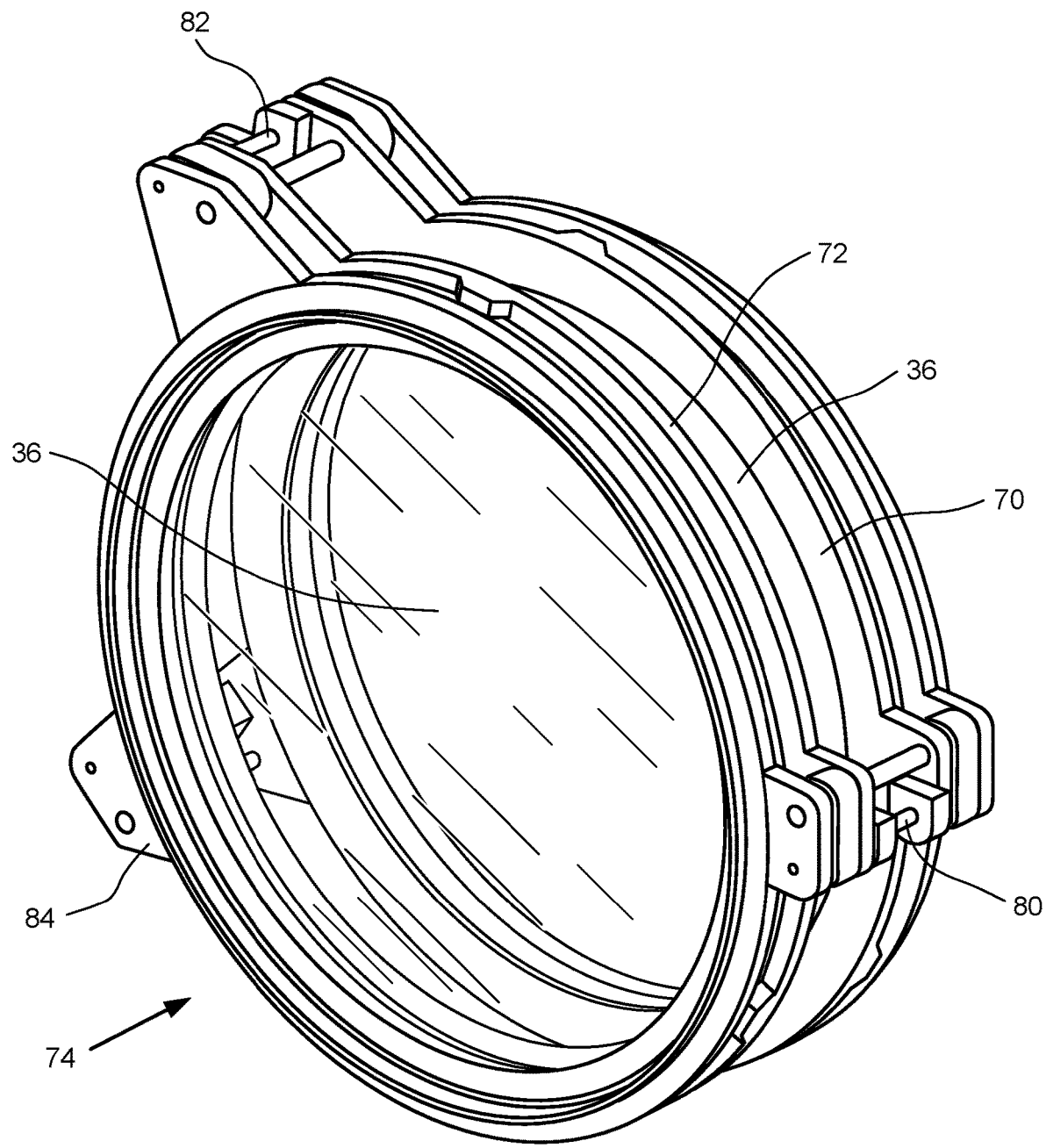

Referring to FIG. 6, a compact variable focus assembly (74) features two rigid perimetric frame members (70, 72)

and an intercoupled fluid/membrane lens (36), with substantially even perimetric loading of the fluid/membrane lens (36) provided by a plurality of shape memory metal alloy actuators (80, 82, 84), which may be utilized to controllably urge or repel the two rigid perimetric frame members (70, 72) relative to each other to provide controllable focal adjustment. The shape memory metal alloy actuators (80, 82, 84) preferably are placed equidistantly from each other perimetrically (i.e., about 120 degrees from each other) to provide even loading with a 3-actuator configuration as shown. Other embodiments may include more actuators, such as four actuators at 90 degrees apart, etc. In one embodiment, each of the shape memory metal alloy actuators (80, 82, 84) may be operatively coupled between the perimetric frame members (70, 72) such that upon actuation, they urge or repel the perimetric frame members (70, 72) relative to each other with linear actuation; in another embodiment each of the shape memory metal alloy actuators (80, 82, 84) may be operatively coupled between the perimetric frame members (70, 72) such that upon actuation, they cause rotational motion of an intercoupling member, such as an intercoupling member similar to the shaft member (62) of the assembly of FIG. 4B, which may be interfaced with a threaded member, such as a threaded member similar to the barrel member (60) of the assembly of FIG. 4B which may be coupled to one of the perimetric frame members (70, 72), for example, to be converted to linear motion to urge or repel the perimetric frame members (70, 72) relative to each other. In other words, the shape memory metal alloy actuators (80, 82, 84) may be configured to produce either linear or rotational actuation motion, and this linear or rotational actuation motion may be utilized to urge or repel the two rigid perimetric frame members (70, 72) relative to each other to provide controllable focal adjustment.

Preferably one or more predictable levels of tightening or loosening of fluid/membrane lens (36) may be obtained through operation of the shape memory metal alloy actuators (80, 82, 84). For example, in one embodiment the shape memory metal alloy actuators (80, 82, 84) may be operatively coupled to a controller, such as a microcontroller or microprocessor, such that a desired or commanded tightening or loosening of the fluid/membrane lens (36), which may be correlated with a predetermined focal length for the fluid/membrane lens (36), may be reliably obtained, preferably with relatively low latency, via commands to the shape memory metal alloy actuators (80, 82, 84) from the controller.

Figure 7A:
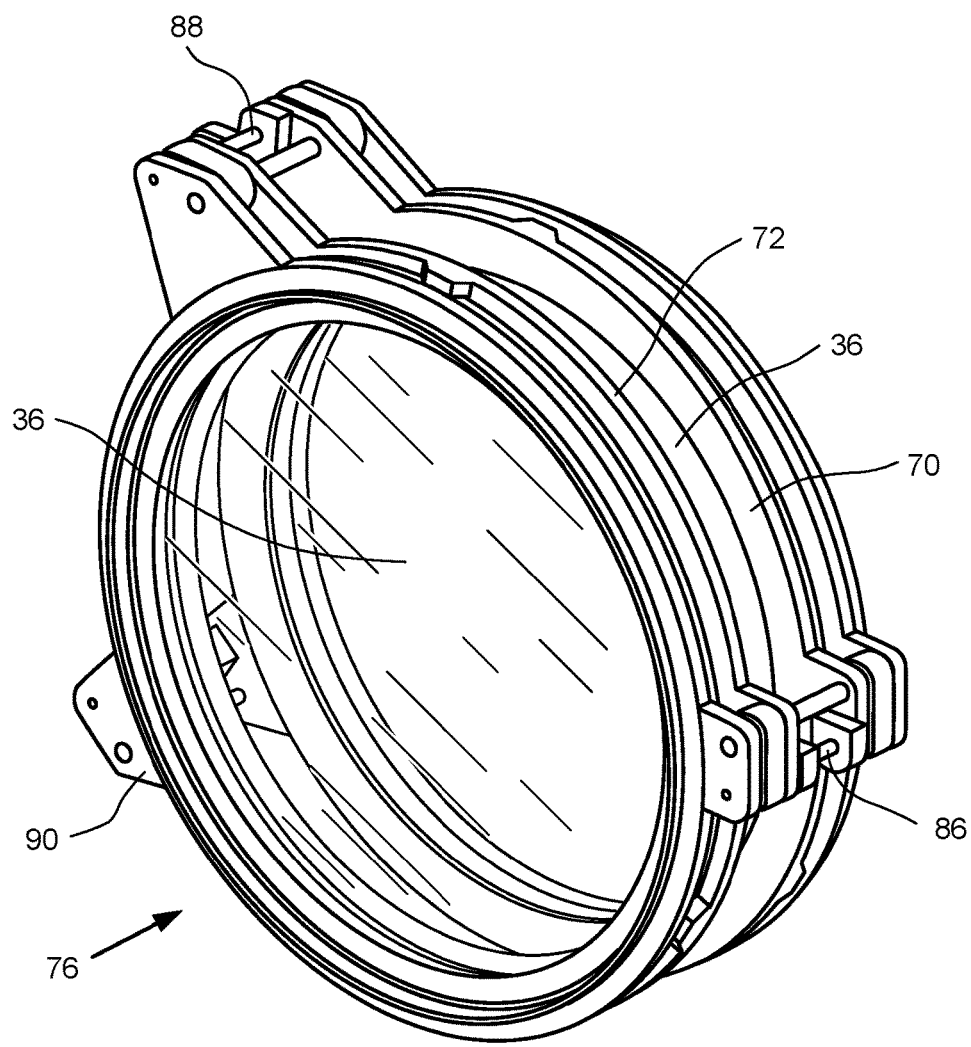
Figure 7B:
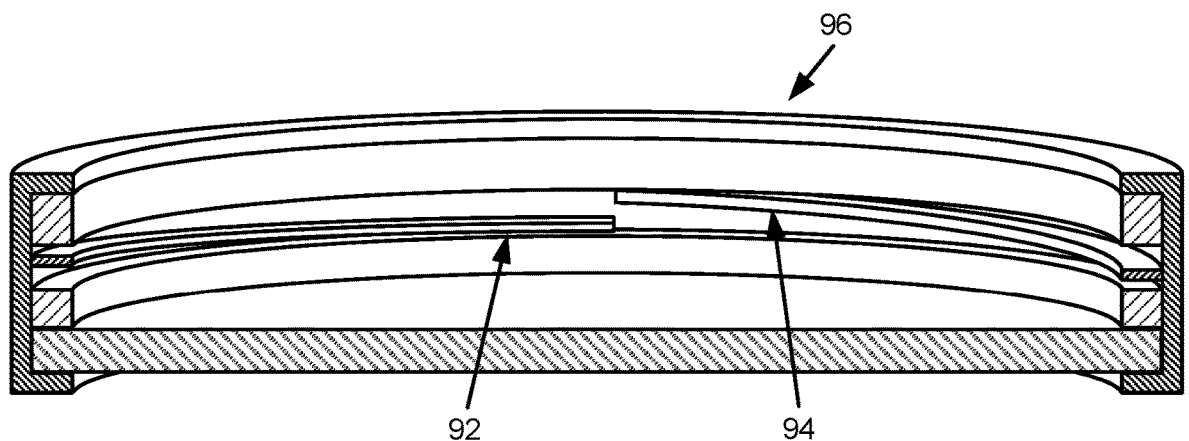

Referring to FIGS. 7A and 7B, a compact variable focus assembly (76) features two rigid perimetric frame members (70, 72) and an intercoupled fluid/membrane lens (36), with substantially even perimetric loading of the fluid/membrane lens (36) provided by a plurality of piezoelectric actuators (86, 88, 90), which may be utilized to controllably urge or repel the two rigid perimetric frame members (70, 72) relative to each other to provide controllable focal adjustment. Each of the piezoelectric actuators (80, 82, 84), may comprise one or more piezoelectric cells configured to produce a given load and displacement change upon actuation, or may comprise a socalled "ultrasound" or "ultrasonic" actuator configuration (i.e., such as those comprising a plurality of piezoelectric material components comprising one or more piezoelectric materials, such as lead zirconate titanate, lithium niobate, or other single crystal materials, configured in a substantially circular arrangement and operatively coupled to a stator and rotor to produce rotary ultrasonic motor activation, or operatively coupled to a stator and slider to produce linear translation ultrasonic motor activation). The piezoelectric actuators (80, 82, 84) preferably are placed equidistantly from each other perimetrically (i.e., about 120 degrees from each other) to provide even loading with a 3-actuator configuration as shown. Other embodiments may include more actuators, such as four actuators at 90 degrees apart, etc. In one embodiment, each of the piezoelectric actuators (80, 82, 84) may be operatively coupled between the perimetric frame members (70, 72) such that upon actuation, they urge or repel the perimetric frame members (70, 72) relative to each other with linear actuation; in another embodiment each of the piezoelectric actuators (80, 82, 84) may be operatively coupled between the perimetric frame members (70, 72) such that upon actuation, they cause rotational motion of an intercoupling member, such as an intercoupling member similar to the shaft member (62) of the assembly of FIG. 4B, which may be interfaced with a threaded member, such as a threaded member similar to the barrel member (60) of the assembly of FIG. 4B which may be coupled to one of the perimetric frame members (70, 72), for example, to be converted to linear motion to urge or repel the perimetric frame members (70, 72) relative to each other. In other words, the piezoelectric actuators (80, 82, 84) may be configured to produce either linear or rotational actuation motion, and this linear or rotational actuation motion may be utilized to urge or repel the two rigid perimetric frame members (70, 72) relative to each other to provide controllable focal adjustment.

Preferably one or more predictable levels of tightening or loosening of fluid/membrane lens (36) may be obtained through operation of the piezoelectric actuators (80, 82, 84). For example, in one embodiment the piezoelectric actuators (80, 82, 84) may be operatively coupled to a controller, such as a microcontroller or microprocessor, such that a desired or commanded tightening or loosening of the fluid/membrane lens (36), which may be correlated with a predetermined focal length for the fluid/membrane lens (36), may be reliably obtained, preferably with relatively low latency, via commands to the piezoelectric actuators (80, 82, 84) from the controller.

Referring to FIG. 7B, depending upon how much mechanical throw is needed in each of the piezoelectric actuators for a given variable focus lens configuration, each of the piezoelectric actuators may comprise an assembly of a series of individual piezoelectric devices (92, 94, etc) intercoupled such that activation of each provides a given mechanical throw which is added to others in the assembly to produce an overall assembly throw which is suitable for the application.

Figure 8A:
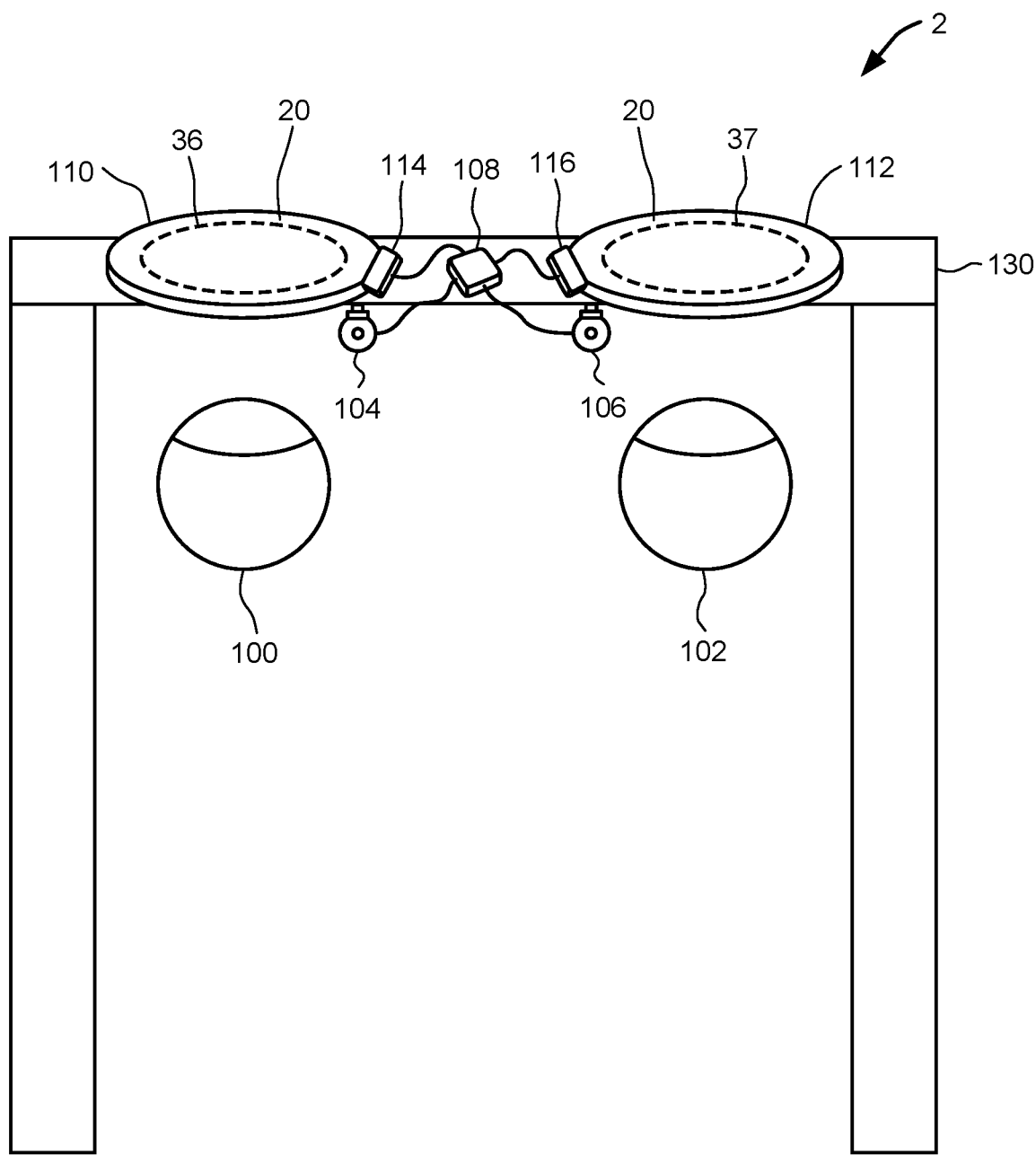
FIGS. 8A and 8B illustrate various aspects of system configurations featuring a head wearable component with left and right optical elements in accordance with the present invention.
Figure 8B:
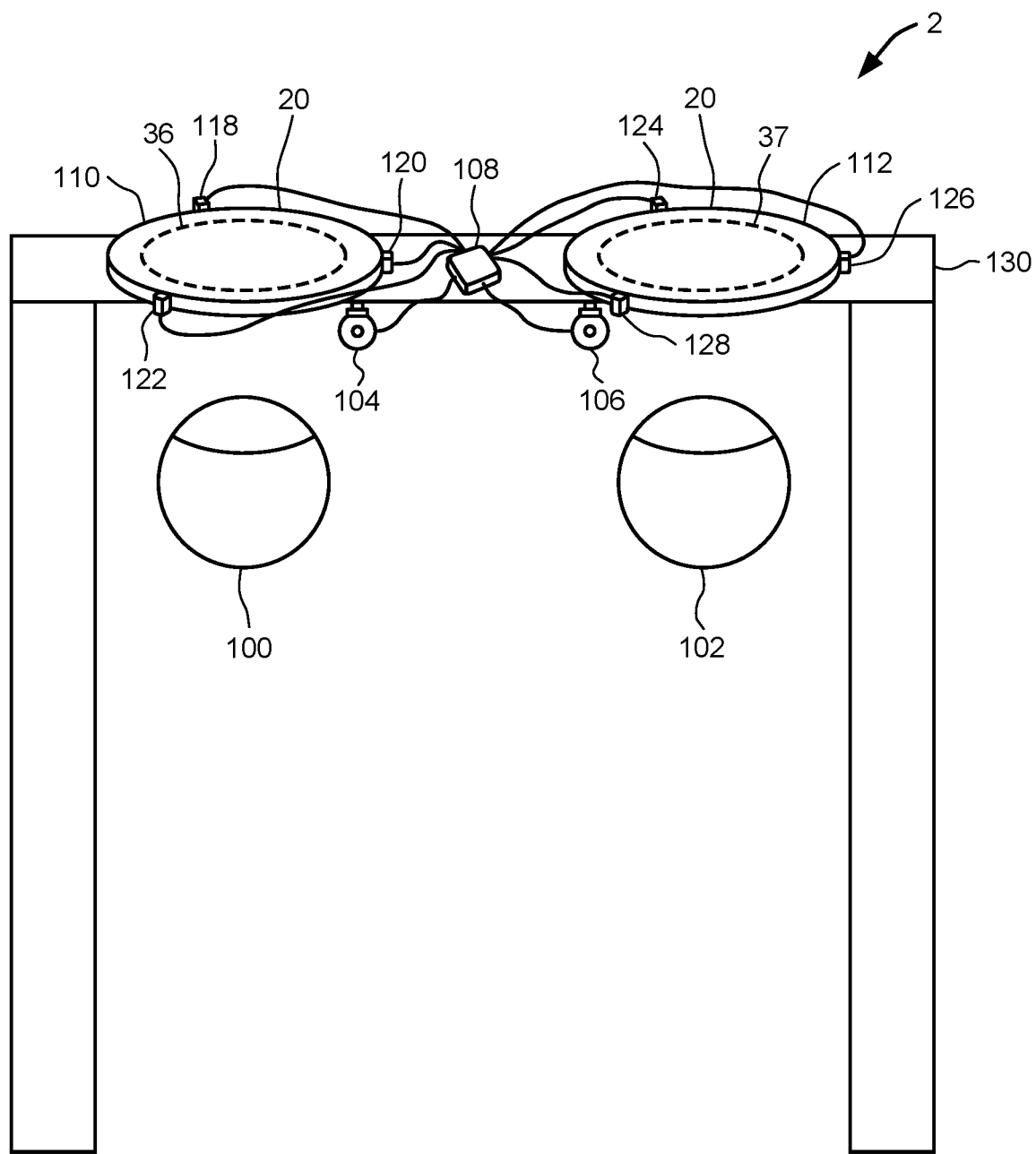

Referring to FIG. 8A, an assembly configuration is illustrated featuring componentry such as discussed above in reference to FIGS. 4A and 4B, with a head wearable component (2) comprising a frame (130) mountable on a user's head so that the user's left (100) and right (102) eyes are exposed to the optical elements (20; here a left optical element 110 and right optical element 112 are separately labelled; these optical elements feature left and right fluid/membrane lenses, 36, and 37, respectively). Left (114) and right (116) motors are configured to electromechanically adjust the focal length of each optical element, as described above in reference to FIGS. 4A and 4B, for example. A controller (108), such as a micro controller or microprocessor, may be utilized to issue commands to the motors (114, 116) to adjust the focal lengths. In various embodiments, cameras (104, 106) may be coupled to the frame (130) and configured to capture data pertaining to the positions of each of the eyes (100, 102); this information may be utilized by the controller (108) in determining how to command the motors (114, 116) in terms of desired focal length. For example, if it is determined that the user is focused on a close-in object relative to the wearable component (2), the system may be configured to have the controller utilize the motors to switch to a closer focal length. FIG. 8B illustrates a configuration analogous to that of FIG. 8A, but with an electromechanical actuation configuration akin to those described in reference to FIGS. 5-7B, wherein a plurality of motors or actuators (118, 120, 122; 124, 126, 128) may be operatively coupled to a controller (108) and utilized to adjust focal length of the optical elements (110, 112).

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed:

1. A head-wearable viewing component for presenting virtual image information to a user, comprising:
   a. a head wearable frame;
   b. a left optical element for a left eye of the user, the left optical element coupled to the head wearable frame and comprising two left perimetric frame members, a left electromechanical device connected between the two left perimetric frame members and a left fluid/membrane lens between the two left perimetric frame members and having an electromechanically adjustable focal length for the left eye of the user while maintaining image stability when the two left perimetric frame members are moved relative to one another by the left electromechanical device;
   c. a right optical element for a right eye of the user, the right optical element coupled to the head wearable frame and comprising two right perimetric frame members, a right electromechanical device connected between the two right perimetric frame members and a right fluid/membrane lens between the two right perimetric frame members and having an electromechanically adjustable focal length for the right eye of the user while maintaining image stability when the two right perimetric frame members are moved relative to one another by the right electromechanical device; and
   d. a controller operatively coupled to the left electromechanical device and the right electromechanical device and configured to provide one or more commands thereto to modify the focal lengths of the left fluid/membrane lens and the right fluid/membrane lens.

2. The head-wearable viewing component of claim 1, wherein at least one of the left and right electromechanical devices comprises an actuation motor intercoupled between the two perimetric frame members of the respective optical element.

3. The head-wearable viewing component of claim 2, wherein the actuation motor is configured to provide linear actuation.

4. The head-wearable viewing component of claim 2, wherein the actuation motor is configured to provide rotational actuation.

5. The head-wearable viewing component of claim 2, wherein the perimetric frame members of the respective optical element are coupled to the fluid/membrane lens perimetric frame members of the respective optical element and configured to change the focal length for the user by linearly moving relative to each other.

6. The head-wearable viewing component of claim 2, wherein the two perimetric frame members of the respective optical element are rotatable relative to each other to modify the focal length for the user.

7. The head-wearable viewing component of claim 2, wherein the two perimetric frame members of the respective optical element are displaceable relative to each other in a non-rotational manner.

8. The head-wearable viewing component of claim 2, wherein the actuation motor comprises a stepper motor.

9. The head-wearable viewing component of claim 2, wherein the actuation motor comprises a servo motor.

10. The head-wearable viewing component of claim 2, wherein the actuation motor comprises a piezoelectric actuator.

11. The head-wearable viewing component of claim 2, wherein the actuation motor comprises an ultrasonic motor.

12. The head-wearable viewing component of claim 2, wherein the actuation motor comprises an electromagnetic actuator.

13. The head-wearable viewing component of claim 2, wherein the actuation motor comprises a shape memory metal alloy actuator.

14. The head-wearable viewing component of claim 1, wherein the controller is configured to command the left and right optical elements to adjust to one of two selectable predetermined focal lengths.

15. The head-wearable viewing component of claim 1, wherein the controller is configured to command the left and right optical elements to adjust to one of three or more selectable predetermined focal lengths.

* * * * *